US011428254B2

(12) United States Patent
Fildan et al.

(10) Patent No.: US 11,428,254 B2
(45) Date of Patent: Aug. 30, 2022

(54) FASTENER SYSTEM

(71) Applicants: Gerhard Fildan, Vienna (AT); Karl Wanzenböck, Teesdorf (AT)

(72) Inventors: Gerhard Fildan, Vienna (AT); Karl Wanzenböck, Teesdorf (AT)

(73) Assignee: DUBROSKY & TRACY PATENT SERVICE CORP., Central (HK)

( * ) Notice: Subject to any disclaimer, the term of this patent is extended or adjusted under 35 U.S.C. 154(b) by 271 days.

(21) Appl. No.: 16/751,272

(22) Filed: Jan. 24, 2020

(65) Prior Publication Data

US 2021/0231151 A1 Jul. 29, 2021

(51) Int. Cl.
*F16B 15/00* (2006.01)
*F16B 13/08* (2006.01)

(52) U.S. Cl.
CPC .............. *F16B 13/08* (2013.01); *F16B 15/00* (2013.01)

(58) Field of Classification Search
CPC .......... F16B 15/08; F16B 27/00; F16B 15/06; E04G 23/0207; E04G 23/0203; Y10T 29/4979; Y10T 29/49789; Y10T 29/49799
USPC ............ 411/442, 443, 444, 908, 452, 451.4; 206/582
See application file for complete search history.

(56) References Cited

U.S. PATENT DOCUMENTS

| | | | |
|---|---|---|---|
| 519,553 A * | 5/1894 | Rounds | E04G 23/0203 206/820 |
| 1,511,711 A * | 10/1924 | Atwell | F16B 15/02 411/475 |
| D92,879 S | 7/1934 | Canter | |
| 2,014,746 A | 9/1935 | Gabriel | |
| 2,231,178 A | 2/1941 | Beckwith | |
| D178,039 S | 6/1956 | Coleman | |
| 4,116,106 A * | 9/1978 | Barbour | E04G 23/0203 52/514 |
| D263,557 S | 3/1982 | Einhorn | |
| 4,971,503 A * | 11/1990 | Barnell | B29C 45/26 411/908 |
| 4,973,211 A * | 11/1990 | Potucek | F16B 15/00 411/452 |
| 5,314,160 A * | 5/1994 | Larsen | A47G 1/20 411/441 |
| D371,294 S | 7/1996 | Anquetin | |
| 6,042,317 A | 3/2000 | Fischer | |
| D577,285 S | 9/2008 | Gaudron | |
| D716,644 S | 11/2014 | Daniels | |
| 9,869,336 B2 * | 1/2018 | Echito | F16B 25/103 |
| D843,200 S | 3/2019 | Tjerrild | |
| D891,235 S | 7/2020 | Liebelt | |
| 2004/0136811 A1 | 7/2004 | Tarlton | |
| 2005/0002751 A1 | 1/2005 | Holland et al. | |
| 2007/0160442 A1 | 7/2007 | Reynolds | |
| 2008/0131231 A1 | 6/2008 | Kuna et al. | |

(Continued)

*Primary Examiner* — Flemming Saether

(74) *Attorney, Agent, or Firm* — Kintner IP, LLC; Mary Frances Ludwig

(57) ABSTRACT

A fastener system includes a fastener or nail for mounting objects on a surface and a corresponding plug for filling a hole left when the nail is removed from the surface. The nail and plug are formed of an engineering plastic, and may be formed from recycled materials. In embodiments, the nail and plug are joined by an arm which is easily broken away. In embodiments, the fastener and plug each have a plurality of flanges which provide strength and grip the surface.

12 Claims, 4 Drawing Sheets

(56) References Cited

U.S. PATENT DOCUMENTS

| | | |
|---|---|---|
| 2008/0175689 A1 | 7/2008 | Vagedes |
| 2013/0108396 A1 | 5/2013 | Hung |
| 2014/0260046 A1* | 9/2014 | Baynham ............ E04G 23/0203 52/514 |
| 2015/0308133 A1* | 10/2015 | Laukka ............... E04G 23/0203 52/514 |
| 2017/0211605 A1 | 7/2017 | Nehl |

* cited by examiner

FASTENER SYSTEM

CROSS REFERENCE TO RELATED APPLICATION

None

TECHNICAL FIELD

The present invention pertains generally to fasteners, and more particularly to a fastener system for mounting objects on a surface.

BACKGROUND OF THE INVENTION

Fasteners used to mount object to surfaces such as plaster walls or drywall can leave unsightly holes when the fasteners are removed from the surface. Hollow fasteners which may be used for strength often require large holes, and removing such fasteners may damage the surface. It is desirable to provide a strong fastener which may be easily installed and cleanly removed. A system to simply patch a hole from removal of fasteners is also desired.

Furthermore, there is an abundance of recycled plastic materials which may be useful in forming small but frequently used parts such as nails.

BRIEF SUMMARY OF THE EMBODIMENTS

Embodiments disclosed herein are directed to a fastener system which includes a fastener or nail and a corresponding plug for filling a hole left by the nail when the nail is removed from a surface. The nail and plug are formed of an engineering plastic, and may be formed from recycled materials. In embodiments the nail and plug are joined by an arm which a user may grasp for convenience and safety when driving the nail into a surface. The arm is easily broken away from the fastener, and the connected plug may be saved for later use.

According to one or more embodiments, a fastener system includes:
  a fastener having a fastener head, a fastener shaft extending from the fastener head, and terminating in a fastener point opposite the fastener head;
  an arm extending outwardly from an upper portion of the fastener shaft;
  a plug having a plug head and a plug shaft extending from the plug head, the plug shaft connected to the arm; and
  wherein the arm forms a frangible junction with each of the fastener and the plug.

According to one or more embodiments, the fastener shaft has a solid core. This feature adds strength to the fastener which is beneficial when driving the fastener into a surface such as plaster or drywall, and also allows heavy objects to be hung from the fastener.

According to any of the above embodiments, the fastener, the plug, and the arm are unitarily formed.

According to any of the above embodiments, the fastener shaft has a plurality of fastener flanges extending from an underside of the fastener head at least partially along a length of the fastener shaft and decreasing in thickness toward the fastener point. The fastener flanges allow the fastener to securely grip the surface.

According to any of the above embodiments, the plug shaft has a plurality of plug flanges extending from an underside of the plug head at least partially along a length of the plug shaft and decreasing in thickness toward an end of the plug shaft. In some embodiments, each of the plurality of plug flanges has a plug flange width which is larger than a fastener flange width of each of the plurality of fastener flanges. These features allow the plug to securely grip the surface without significantly enlarging the hole left by the removed fastener.

According to any of the above embodiments, the fastener, the plug, and the arm are formed of polyoxymethylene.

According to any of the above embodiments, the arm has an arm width which decreases from a central region of the arm to each of the frangible junctions. The decrease in width allows the arm to be readily separated from the fastener, such as by snapping the arm off or by driving the fastener against the surface to break the junction.

According to any of the above embodiments, the upper portion of the fastener shaft from which the arm extends begins directly underneath the fastener head and consists of an upper one third of a length of the fastener shaft.

According to other embodiments, a fastener system for mounting an object on a surface, includes:
  a fastener having a fastener head, a fastener shaft extending from the fastener head and terminating in a fastener point opposite the fastener head, and a plurality of fastener flanges on the fastener shaft extending from an underside of the fastener head at least partially along a length of the fastener shaft, decreasing in thickness toward the fastener point, and configured to grip the surface when the fastener is driven into the surface;
  a plug having a plug head, a plug shaft extending from the plug head, and a plurality of plug flanges extending from an underside of the plug head at least partially along a length of the plug shaft and decreasing in thickness toward an end of the plug shaft; and
  wherein the plurality of plug flanges correspond in number and relative position about the plug shaft to the number of the plurality of fastener flanges and the relative position of the fastener flanges about the fastener shaft, such that the plug is configured for insertion into the surface with the plug flanges configured to grip the surface when the fastener is removed from the surface.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the fastener system are described with reference to the following figures, wherein like reference numerals refer to like parts throughout the various views unless otherwise specified.

Figure 2:
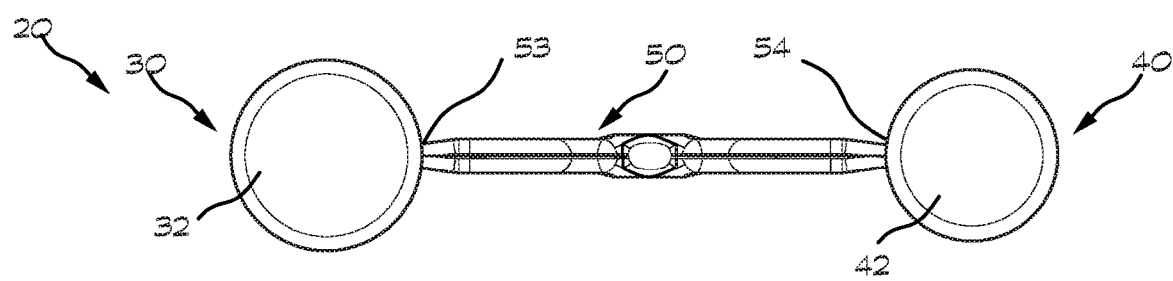
FIG. 2 is a top plan view of the FIG. 1 embodiment.
Figure 1:
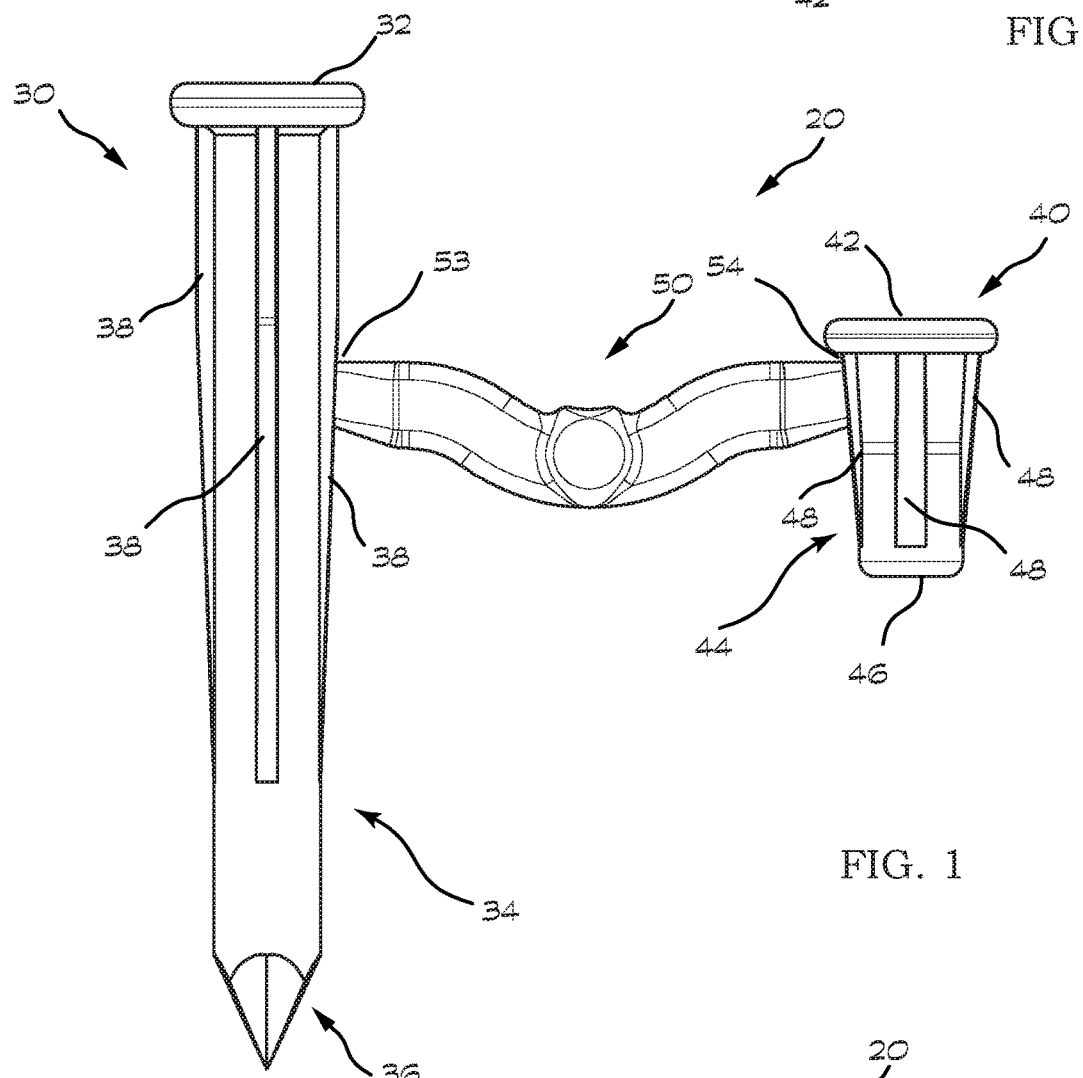
FIG. 1 is a front elevation view of an embodiment of a fastener system, the rear elevation view being a mirror image thereof.
Figure 3:
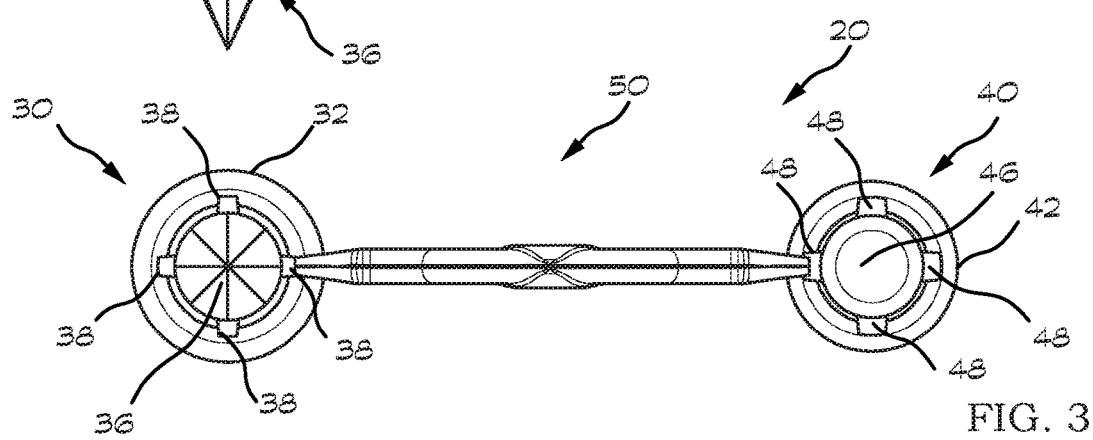
FIG. 3 is bottom plan view of the FIG. 1 embodiment.
Figure 4:
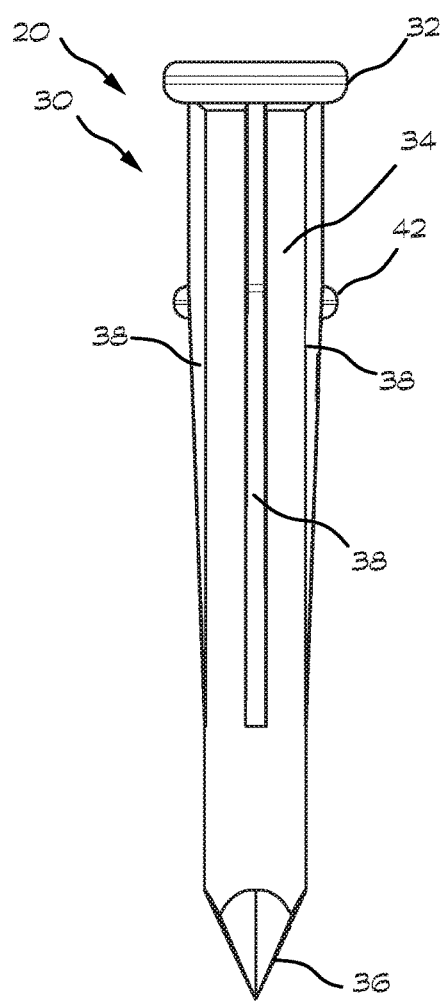
FIG. 4 is a left side elevation view of the FIG. 1 embodiment.
Figure 5:
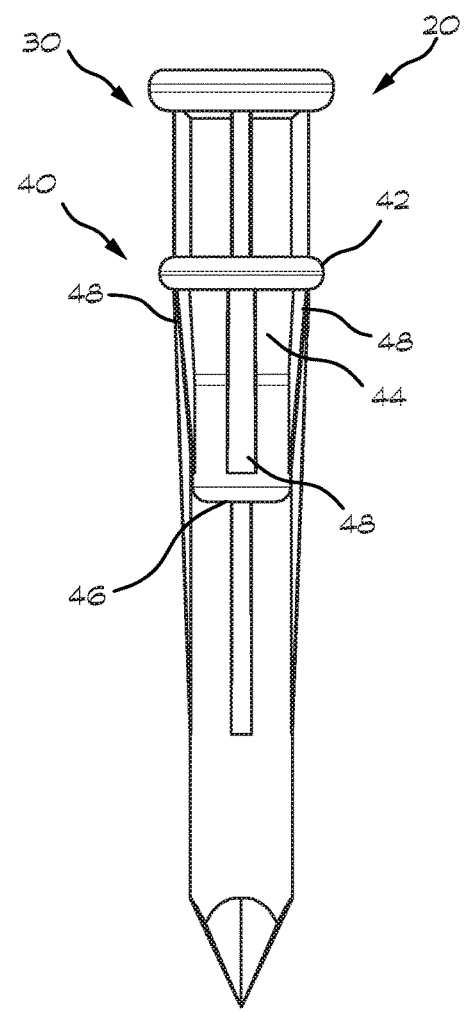
FIG. 5 is a right side elevation view of the FIG. 1 embodiment.
Figure 6:
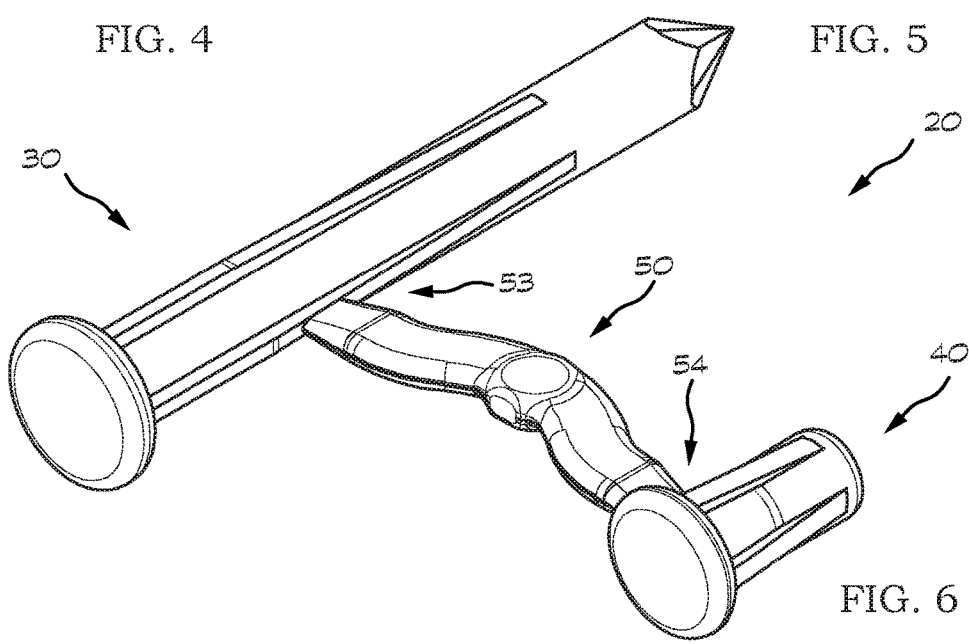
FIG. 6 is a perspective view of the FIG. 1 embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment may not be depicted in order to facilitate a less obstructed view of these various embodiments.

DETAILED DESCRIPTION OF THE INVENTION

Referring initially to FIGS. 1-6, there are illustrated front elevation, top and bottom plan, left and right side elevation, and perspective views, respectively, of an embodiment of a fastener system generally designated as 20. Fastener system 20 includes a fastener 30, a plug 40, and an arm 50 connecting the fastener and the plug. In general terms, fastener 30 may be installed in a surface and used for mounting an object on the surface. Before or during installation, the arm 50 and plug 40 may be separated from fastener 30 and reserved for later use. When fastener 30 is removed from the surface, plug 40 may be used to fill and cover the hole which remains in the surface.

Fastener 30 is generally configured like a nail, and has a fastener head 32, a fastener shaft 34 extending from the fastener head, and terminates in a fastener point 36 which is located at the bottom of the fastener shaft 34 opposite the fastener head. Plug 40 has a plug head 42 and a plug shaft 44 extending from the plug head. Plug shaft 44 terminates in a substantially flat plug bottom 46.

Arm 50 extends outwardly from an upper portion of fastener shaft 34 (see junction 53). Plug shaft 44 is connected to the arm at junction 54 opposite the fastener shaft. In embodiments fastener 30, plug 40, and arm 50 are unitarily formed. Arm 50 forms a frangible junction 53 with fastener 30 and also forms a frangible junction 54 with plug 40. In other words, arm 50 may be easily broken away from the fastener and plug at junctions 53, 54 respectively.

Fastener 30 may have a plurality of fastener flanges 38 which extend from the underside of fastener head 32 at least partially along the length of fastener shaft 34. In the shown embodiment, four fastener flanges 38 are present. Fastener flanges 38 decrease in thickness toward the fastener point 36, where thickness T38 is measured radially outward from a central longitudinal axis X of fastener shaft 34 (see FIG. 7A). Fastener flanges 38 improve grip between fastener 30 and the cooperating surface, and increase the shear strength of fastener 30. In addition, fastener flanges 38 resist spinning of the fastener once mounted, thereby increasing stability.

Similarly, plug 40 may have a plurality of plug flanges 48 which extend from the underside of plug head 42 at least partially along the length of plug shaft 44. In the shown embodiment, four plug flanges 48 are present. Plug flanges 48 decrease in thickness toward the plug bottom 48, where thickness T48 is measured radially outward from a central longitudinal axis Y of plug shaft 44 (see FIG. 7A). In some embodiments, fastener system 20 may include both fastener flanges 38 and plug flanges 48. In other embodiments, fastener system 20 may include plug flanges 48 without fastener flanges 38.

Figure 7B:
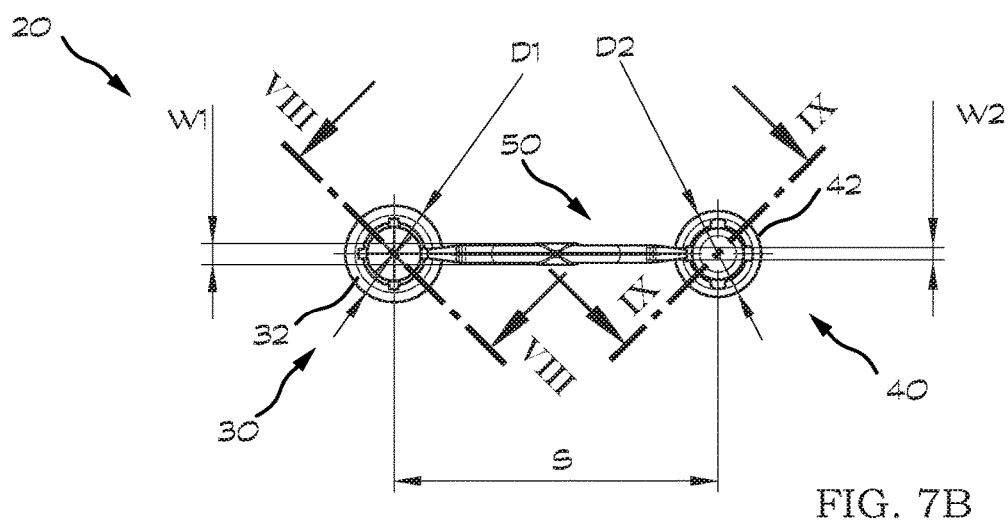
FIGS. 7A and 7B are reduced front elevation and bottom plan views, respectively, of another embodiment of the fastener system.
Figure 7A:
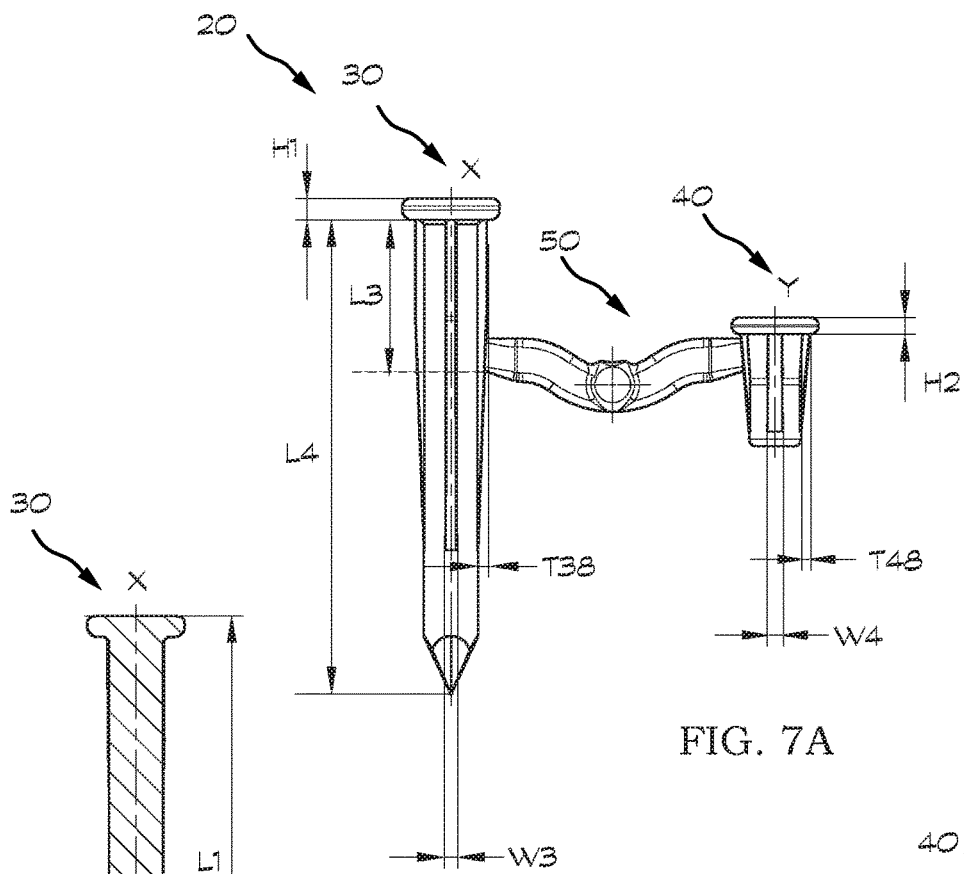

FIGS. 7A and 7B are reduced front elevation and bottom plan views, respectively, of another embodiment of fastener system 20 in relation to which the following dimensions are provided as non-limiting exemplary configurations. Fastener 30 has a length L1 which may be about 23 mm or about 1 inch. Plug 40 has a length L2 which is shorter than L1, and which may be about 6 mm or about 0.25 inch. Fastener head 32 has a diameter D1 which may be about 4.5 mm or may be about 0.18 inch. Plug head 42 has a diameter D2 which is smaller than D1, and which may be about 4.0 mm or may be about 0.16 inch. Fastener head 32 has a height H1 which may be about 1.0 mm or may be about 0.04 inch. Plug head 42 has a height H2 which is less than H1, and which may be about 0.8 mm or may be about 0.03 inch.

Arm 50 of the FIG. 7A-7B embodiment has an arm width W1 as measured approximately in the center of arm 50. Arm width W1 may be about 1.0 mm or may be about 0.04 inch. Arm width decreases in the area of the frangible junctions 53, 54 with the fastener and shaft to a width W2, which may be about 0.8 mm or may be about 0.03 inch. The arm provides a separation distance S between axes X & Y of the fastener and plug; distance S may be about 15 mm or about 0.5 inch. Arm 50 extends from an upper portion of fastener shaft 34, which has a length L3 measured from the underside of fastener head 32. L3 may be about one half of the length L4 of the fastener shaft, or L3 may be about one third of L4.

Fastener flanges 38 have a fastener flange width W3 and plug flanges 48 have a plug flange width W4. W4 is greater than W3, which enables the plug to more securely grip a hole in the surface which from which the fastener has been removed. In embodiments, W4 may be about 0.8 mm or may be about 0.03 inch; W3 may be about 0.6 mm or may be about 0.02 inch.

Figure 8:
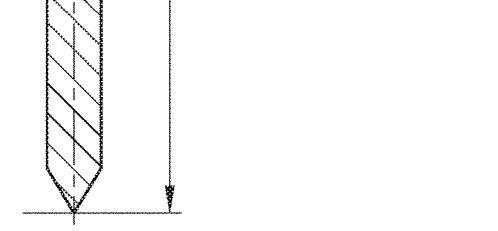
FIG. 8 is a cross-sectional view along line VIII-VIII of FIG. 7B.
Figure 9:
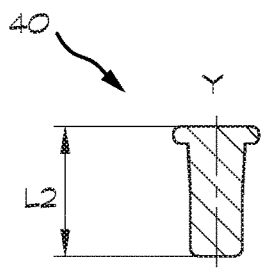
FIG. 9 is a cross-sectional view along line IX-IX of FIG. 7B.

FIGS. 8 & 9 are cross-sectional views, respectively, along lines VIII-VIII and IX-IX of FIG. 7B. In the shown embodiment, both fastener shaft 34 and plug shaft 44 have a solid core. The solid core provides strength and support to the fastener and plug.

Fastener system 20 may be formed of an engineering plastic such as polyoxymethylene (POM) or other plastics with high hardness and which do not absorb water. In embodiments, fastener system 20 may be formed of recycled plastic, such as POM which is recycled from garment fasteners or production byproducts thereof. The material of fastener system 20 may be black, white, translucent, or other colors.

Figure 10A:
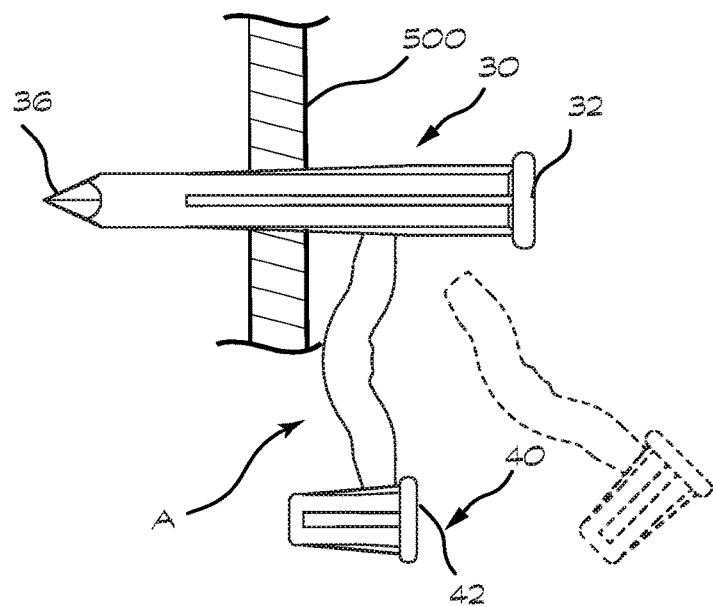
FIGS. 10A & 10B are example illustrations of an embodiment of the fastener system in use.
Figure 10B:
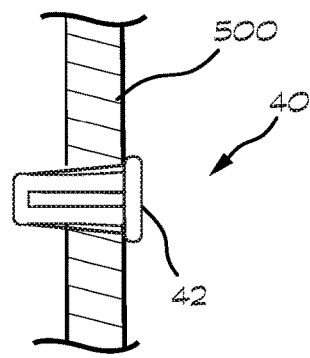

FIGS. 10A & 10B are example illustrations of an embodiment of the fastener system in use. A method of using the fastener system to mounting an object (not shown) on a surface 500 includes (refer also to FIGS. 1-9):

a) providing a fastener system 20 including:

i) a fastener 30 having a fastener head 32, a fastener shaft 34 extending from the fastener head, and terminating in a fastener point 36 opposite the fastener head;
ii) an arm 50 extending outwardly from an upper portion of the fastener shaft 34;
iii) a plug 40 having a plug head 42 and a plug shaft 44 extending from the plug head, the plug shaft connected to the arm; and
iv) wherein the arm forms a frangible junction 53, 54 with each of the fastener and the plug;

b) gripping arm 50 or plug 40 (for example, gripping the arm by hand generally in region A of FIG. 10A);
c) driving fastener 30 into surface 500, such as with a hammer, to a depth where the arm contacts the surface (for example, arm 50 contacting surface 500 at frangible junction 53);
d) disconnecting arm 50 and plug 40 from fastener 30 (i.e. breaking the arm and plug away from the fastener at frangible junction 53, such as by snapping the arm off by hand or continuing to drive the fastener past the point where arm 50 contacts surface 500); and
e) mounting the object with the fastener, in a manner like hanging an object from a nail.

The method further includes: removing fastener 30 from surface 500 thereby leaving a hole in the surface; inserting plug 40 into the hole; and driving the plug into the hole so that plug head 42 is in contact with surface 500. Plug 40 may be pushed into the hole by hand or driven with a hammer or mallet. If desired, plug 40 may be driven with a mallet and tap to countersink plug head 42 into surface 500, which may provide a flush appearance.

Figure 11A:
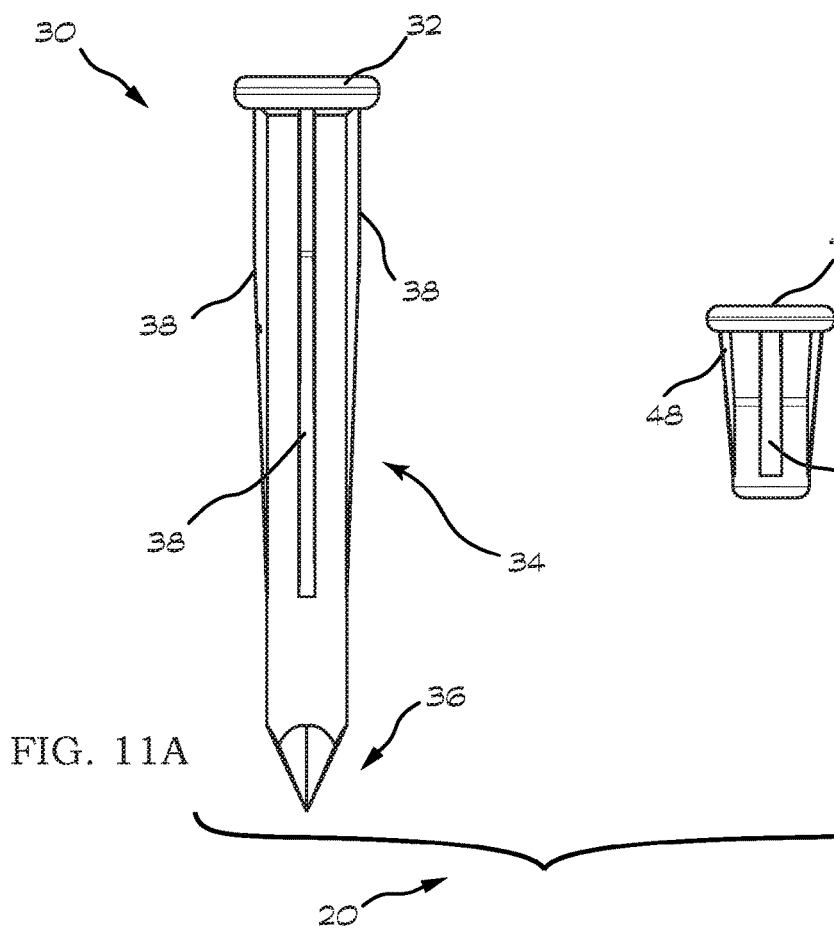
FIG. 11A is a front elevation view of an embodiment of a fastener, the rear elevation, left side, and right side views of the embodiment of the fastener being identical thereto.
Figure 11B:
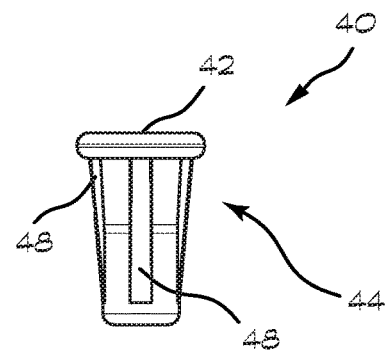
FIG. 11B is a front elevation view of an embodiment of a plug, the rear elevation, left side, and right side views of the embodiment of the plug being identical thereto.

In another embodiment, fastener system 20 includes a fastener 30 and a plug 40 which are not joined by an arm. FIG. 11A is a front elevation view of an embodiment of a fastener, and FIG. 11B is a front elevation view of an embodiment of a plug. Fastener system 20 includes:

a fastener 30 having a fastener head 32, a fastener shaft 34 extending from the fastener head and terminating in a fastener point 36 opposite the fastener head, and a plurality of fastener flanges 38 on the fastener shaft extending from an underside of the fastener head at least partially along a length of the fastener shaft, decreasing in thickness toward the fastener point, and configured to grip the surface when the fastener is driven into the surface;
a plug 40 having a plug head 42, a plug shaft 44 extending from the plug head, and a plurality of plug flanges 48 extending from an underside of the plug head at least partially along a length of the plug shaft and decreasing in thickness toward an end of the plug shaft; and
wherein the plurality of plug flanges correspond in number and relative position about the plug shaft to the number of the plurality of fastener flanges and the relative position of the fastener flanges about the fastener shaft, such that the plug is configured for insertion into the surface with the plug flanges configured to grip the surface when the fastener is removed from the surface.

In an embodiment of the fastener system of FIGS. 11A & 11B, each plug flange 48 has a plug flange width which is larger than the width of each fastener flange 38 (see also W3, W4 of FIG. 7A).

The embodiments of the fastener system and methods of use described herein are exemplary and numerous modifications, combinations, variations, and rearrangements can be readily envisioned to achieve an equivalent result, all of which are intended to be embraced within the scope of the appended claims. Further, nothing in the above-provided discussions of the fastener system and methods should be construed as limiting the invention to a particular embodiment or combination of embodiments. The scope of the invention is defined by the appended claims.

We claim:

1. A fastener system, comprising:
a fastener having a fastener head, a fastener shaft extending from the fastener head, a plurality of fastener flanges extending from an underside of the fastener head at least partially along a length of the fastener shaft, and terminating in a fastener point opposite the fastener head;
an arm extending outwardly from an upper portion of the fastener shaft;
a plug having a plug head and a plug shaft extending from the plug head, the plug shaft connected to the arm;
wherein the plug shaft has a plurality of plug flanges extending from an underside of the plug head at least partially along a length of the plug shaft and decreasing in thickness toward an end of the plug shaft;
wherein each of the plurality of plug flanges has a plug flange width which is larger than a fastener flange width of each of the plurality of fastener flanges; and
wherein the arm forms a frangible junction with each of the fastener and the plug.

2. The fastener system according to claim 1, wherein:
the fastener shaft has a solid core.

3. The fastener system according to claim 1, wherein:
the fastener, the plug, and the arm are unitarily formed.

4. The fastener system according to claim 1, wherein:
the plurality of fastener flanges decrease in thickness toward the fastener point.

5. The fastener system according to claim 1, wherein:
the fastener, the plug, and the arm are formed of polyoxymethylene.

6. The fastener system according to claim 1, wherein:
the arm has an arm width which decreases from a central region to each of the frangible junctions.

7. The fastener system according to claim 1, wherein:
the upper portion of the fastener shaft from which the arm extends begins directly underneath the fastener head and consists of an upper one third of a length of the fastener shaft.

8. A method of mounting an object on a surface, the method comprising:
a) providing a fastener system including:
i) a fastener having a fastener head, a fastener shaft extending from the fastener head, a plurality of fastener flanges extending from an underside of the fastener head at least partially along a length of the fastener shaft, and terminating in a fastener point opposite the fastener head;
ii) an arm extending outwardly from an upper portion of the fastener shaft;
iii) a plug having a plug head and a plug shaft extending from the plug head, the plug shaft connected to the arm;
iv) wherein the plug shaft has a plurality of plug flanges extending from an underside of the plug head at least partially along a length of the plug shaft and decreasing in thickness toward an end of the plug shaft;
v) wherein each of the plurality of plug flanges has a plug flange width which is larger than a fastener flange width of each of the plurality of fastener flanges; and vi) wherein the arm forms a frangible junction with each of the fastener and the plug;

b) gripping either one or both of the arm and the plug;

c) driving the fastener into the surface to a depth where the arm contacts the surface;

d) disconnecting the arm and plug from the fastener; and e) mounting the object with the fastener.

9. The method of claim 8, further including:

removing the fastener from the surface thereby leaving a hole in the surface;

inserting the plug into the hole; and driving the plug into the hole so that the plug head is in contact with the surface.

10. The method of claim 8, further including:

in (d), driving the fastener deeper into the surface so that the frangible junction of the arm with the fastener contacts the surface and breaks, thereby disconnecting the arm from the fastener.

11. A fastener system for mounting an object on a surface, comprising:

a fastener having a fastener head, a fastener shaft extending from the fastener head and terminating in a fastener point opposite the fastener head, and a plurality of fastener flanges on the fastener shaft extending from an underside of the fastener head at least partially along a length of the fastener shaft, decreasing in thickness toward the fastener point, and configured to grip the surface when the fastener is driven into the surface;

a plug having a plug head, a plug shaft extending from the plug head, and a plurality of plug flanges extending from an underside of the plug head at least partially along a length of the plug shaft and decreasing in thickness toward an end of the plug shaft;

wherein the plurality of plug flanges correspond in number and relative position about the plug shaft to the number of the plurality of fastener flanges and the relative position of the fastener flanges about the fastener shaft, such that the plug is configured for insertion into the surface with the plug flanges configured to grip the surface when the fastener is removed from the surface; and each of the plurality of plug flanges has a plug flange width which is larger than a fastener flange width of each of the plurality of fastener flanges.

12. The fastener system according to claim 11, wherein:

the fastener, the plug, and the arm are formed of polyoxymethylene.

\* \* \* \* \*